US007021549B2

(12) United States Patent
O'Rell et al.

(10) Patent No.: US 7,021,549 B2
(45) Date of Patent: Apr. 4, 2006

(54) LASER MARKABLE VARIABLE DATA HEAT TRANSFER LABEL AND MARKING SYSTEM

(75) Inventors: Dennis D. O'Rell, Geneva, IL (US); Arthur J. Malin, Northbrook, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/883,403

(22) Filed: Jun. 30, 2004

(65) Prior Publication Data

US 2006/0000913 A1 Jan. 5, 2006

(51) Int. Cl.
*G06K 19/02* (2006.01)

(52) U.S. Cl. ....................................... 235/488; 235/487

(58) Field of Classification Search ................ 235/488, 235/487, 384; 283/86
See application file for complete search history.

(56) References Cited

U.S. PATENT DOCUMENTS

| | | | | |
|---|---|---|---|---|
| 3,989,575 | A * | 11/1976 | Davies et al. | 156/355 |
| 5,284,688 | A * | 2/1994 | Hiatt | 428/41.4 |
| 6,241,841 | B1 * | 6/2001 | Mahn et al. | 156/240 |
| 6,749,992 | B1 * | 6/2004 | Bennett et al. | 430/272.1 |
| 6,786,994 | B1 * | 9/2004 | Williams et al. | 156/240 |
| 6,796,352 | B1 * | 9/2004 | Geurtsen et al. | 156/446 |
| 6,815,397 | B1 * | 11/2004 | Ishida et al. | 503/227 |
| 2004/0026921 | A1 * | 2/2004 | Krone et al. | 283/92 |

* cited by examiner

*Primary Examiner*—Steven S. Paik
(74) *Attorney, Agent, or Firm*—Mark W. Croll, Esq.; Jay Saltzman, Esq.; Welsh & Katz, Ltd.

(57) ABSTRACT

A laser markable heat transfer label for application to an item includes a light transmissive carrier, a heat transferable substrate disposed on the carrier and an adhesive disposed on the substrate. The substrate is formulated, at least in part, with a laser light alterable material. A variable graphic component is marked on the label by application of a laser light through the light transmissive carrier, into the substrate to alter the laser light alterable material. The variable graphic component is marked prior to application of the heat transfer label to the item. A method of making and a method of using the laser markable labels are also disclosed.

39 Claims, 1 Drawing Sheet

LASER MARKABLE VARIABLE DATA HEAT TRANSFER LABEL AND MARKING SYSTEM

BACKGROUND OF THE INVENTION

The present invention relates to indicia-containing labels. More particularly, the present invention relates to laser markable heat transfer labels that contain fixed and variable data, which labels are applied to articles to provide unique markings, and systems for making such markings.

Graphics-containing labels are in widespread use in most every industry. In the garment industry, labels are used to mark articles of clothing to identify the manufacturer, the size of the garment, to provide laundry instructions, composition of the fabric, manufacturing location information and the like. In such a marking, there is both fixed and variable data. The fixed data can include the manufacturer, manufacturing location and laundry instructions whereas the size of the garment and the composition of the fabric can be variable data.

Another market that uses labels is the durable goods market. In this market, labels may be used on, for example, hand held power tools. Such labels may include both fixed data, e.g., manufacturer's name and manufacturing location, and variable data, e.g., model number, serial number, and power (voltage and ampere) requirements.

One drawback to the use of individually printed labels (that is, labels with variable data) is that large inventories of completely finished pre-printed labels are needed at the manufacturing or packaging location. While this approach provides desirable information on an item-attached label, the large label inventory that is needed, in conjunction with the space necessary for storing such an inventory, makes this approach undesirable.

In addition, when such individualized or customized labels are used, they are maintained in large quantities in inventory. This increases the likelihood of label obsolescence. As such, there may well be a large quantity of completely finished labels in inventory when a product is changed or discontinued.

Moreover, the types and configurations of such printing are dependent upon the types of inks or tinted transfer media that is used. This can also be limited when, for example, a lighter color "print" is desired on a darker color background. Moreover, such labels use conventional printing technologies employing consumables such as ink ribbons for carrying and transferring the inks to the label.

Accordingly, there is a need for a variable data heat transfer label that provides the flexibility to locally print variable, e.g., changeable data, immediately prior to applying the label to the item. Desirably, such a label includes some manner of fixed data and a region in which the variable data is provided and through which the data is viewed when the label is affixed to an object or item. Most desirably, such a label is made without the use of consumable ink ribbons and the like.

SUMMARY OF THE INVENTION

A laser markable heat transfer label for application to an item, such as an article of clothing includes a light transmissive carrier, a heat transferable substrate disposed on the carrier, and an adhesive disposed on the substrate. The substrate is formulated, at least in part, with a laser light alterable material. A variable graphic component is marked on the label by application of laser light through the light transmissive carrier, into the substrate. This alters the laser light alterable material. The variable graphic component is marked prior to application of the heat transfer label to the item.

Advantageously, the present label can be used on a dark color background or a light color background. The label provides the flexibility to locally print variable data or graphics immediately prior to applying the label to the item. The label can include some manner of fixed data and a region in which the variable data is provided and through which the data is viewed when the label is affixed to an object or item.

The label is made without the use of consumables (such as ink ribbons) for producing the variable data. In this manner, no consumables are needed on hand at the site at which the variable data is marked into the label.

A method for marking an item includes providing an elongated light transmissive carrier web, applying a heat transferable substrate having a laser light alterable material disposed in a polymer matrix to the carrier web and exposing the substrate having the laser light alterable material therein to a laser. This alters a portion of the light alterable material to form a variable graphic component. The variable graphic component is marked separate from the step of applying the heat transferable substrate to the carrier web to form an elongated strip of heat transferable labels. The laser can be used to ablate a portion of the light alterable material or it can be used to change the color of the light alterable material. A fixed graphic component can be applied to the labels prior to laser marking.

These and other features and advantages of the present invention will be readily apparent from the following detailed description, in conjunction with the claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
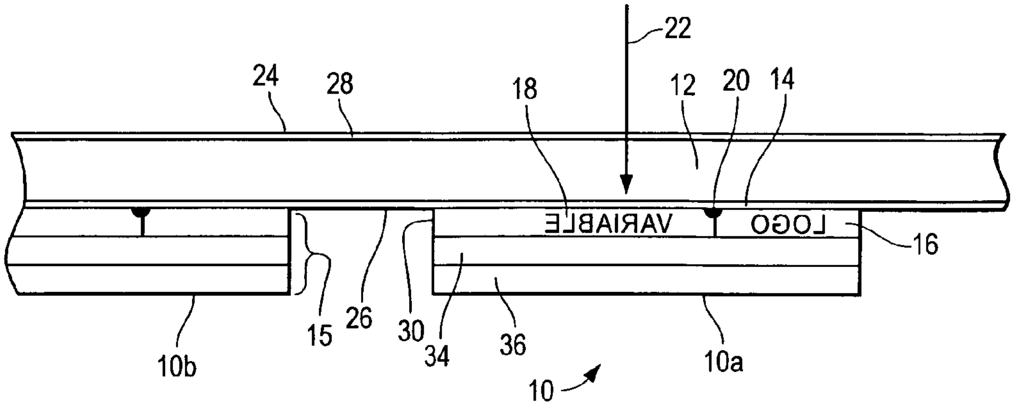
FIG. 1 is a cross-sectional illustration of one embodiment of a laser markable variable data heat transfer label configured for use with a dark color object.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be understood that the title of this section of this specification, namely, "Detailed Description Of The Invention", relates to a requirement of the United States Patent Office, and does not imply, nor should be inferred to limit the subject matter disclosed herein.

In the present disclosure, the terms article, item, object, and product are used interchangeably to describe something that is produced that has commercial value and is, for example, an item that is the subject of a commercial transaction.

Referring now to the figures and briefly, to FIG. 1, there is shown one embodiment of a laser markable variable data heat transfer label 10, embodying the principles of the present invention. This embodiment of the label 10 is configured for use on or with an object that has a dark background. For example, this embodiment of the label 10 can be used on dark colored (blue or black) shirts and the like.

In the illustrated embodiment, a carrier web 12 is shown with two discrete labels 10*a*, 10*b* on the carrier web 12. The label 10 includes the carrier web 12, on which the label 10 is printed or formed, a release coat 14, a fixed graphic component 16, a variable graphic component 18 and optionally an eye mark 20. The web 12 is formed from a laser light-translucent or laser light-transmissive material. This, as will be discussed below, permits the use of a laser (indicated generally at 22) that is directed through the rear or back side of the label 10 (i.e., through the carrier web 12) to carry out the marking function. In a present label 10 the web 12 material is a polyethylene or more preferably a polypropylene material. Other suitable materials will, however, be recognized by those skilled in the art and are within the scope of the present invention.

The release coat 14 can be a silicone-type release coat that is formed or applied as a continuous coating on the web 12, between the web 12 and the label substrate (indicated at 15), or as discrete sections disposed on those areas at which, and on which, the label will be printed (see FIG. 2 and the discussion below). Typically, both sides of the carrier web 12 have a release coating 14, 24, and the release coatings will generally have different release characteristics. The printed side as indicated at 26 will typically have a tighter release than the non-printed side as indicated at 28. The non-printed side 28 is typically a continuous release coating.

A dark layer 30 is then applied on the release layer 14. The dark layer 30 is formed from a laser light alterable material. In a present label 10, the laser light alterable material 30 is a laser light ablatable material. That is, laser 22 light can be used to ablate or remove portions of the layer 30 to form the variable graphic component 18.

Adjacent to the light alterable material layer 30, an optional fixed graphic component 16 can be provided. The fixed graphic 16 can be applied along side the light alterable material 30. Alternately, the fixed graphic component 16 can be provided, e.g., applied prior or subsequent to the light alterable layer 30. Optionally, the eye mark 20 can be applied with the fixed graphic 16. The eye mark 20 can be provided as a normal, ambient light visible material, or it can be provided as an ultraviolet or infrared visible (otherwise non-ambient visible) material. The eye mark 20 can be used to start or stop advancement of the web 12 or trigger a subsequent operation such as the actuation of a cutting device or to position the label 10 in a (web fed) heat transfer device.

It is also anticipated that the eye mark 20 can be used to verify the authenticity of the label 10 and to control the form, text, graphics, and the like of the variable data 18 marked on the label 10. The eye mark 20 can also be printed in the form of a two dimensional bar code such as those having a 2D Matrix Symbol that is commonly used in the industry, for example, as represented by DataMatrix, MaxiCode and QR Code. Other special conditions of lighting, for eye marks include electronic sensing, e.g., magnetic responsive inks. The machine readable eye marks may also be a component of the fixed graphics, through either graphic design parameters (such as shape, size, color contrast and the like), or the incorporation of special chemicals, including ultraviolet or infra-red active compounds, magnetic responsive inks, electrically activated luminescence, thermochromatic inks, photochromatic inks and the like.

Following the application or printing of the light alterable material 30, the optional fixed graphic component 16 and eye mark 20, a contrasting color layer 34 is applied. For example, if a blue or black color light alterable material 30 is used, then a white or other light, contrasting color layer 34 can be used. It will be appreciated that the specific colors can vary greatly depending upon the object or item to which the label 10 is applied and the desired effect of the labeling.

An adhesive layer 36 is applied to the contrasting layer 34. The adhesive layer 36 is that layer that adheres the label 10 to the object or item. In the present example (in which the object is dark, the light alterable layer 30 is dark and the contrasting layer 34 is light), the adhesive layer 36 can likewise be dark to blend in with the object and the material forming the light alterable layer 30. Alternately, the adhesive layer 36 can be a contrasting color (similar to the contrasting layer 34) or it can be a transparent/translucent material. A present adhesive 36 is not a cross linked material, but has a lower melt point, less than about 275° F., preferably less than about 250° F. and most preferably less than about 230° F. In transferring the label 10 to an object, typically the adhesive layer 36 on the label 10 softens and adheres to the object by the application of heat and pressure.

The variable graphic 18 is provided on the label 10 by ablating material (as indicated at 18) in the light alterable layer 30 thus exposing the contracting layer 34. The material 30 is ablated by exposure to laser 22 light. In forming a present label 10, the laser 22 is a CO2 laser and the light alterable layer 30 is exposed through the carrier web 12. That is, the laser 22 light exposes the material 30 through the rear or back side of the label 10 (i.e., through the carrier web 12) following formation of the label 10. In this manner, the variable data 18 can be provided on the label 10 in a downstream process following manufacture of the label 10 and provision, e.g., printing, of the fixed graphic component 16.

Figure 2:
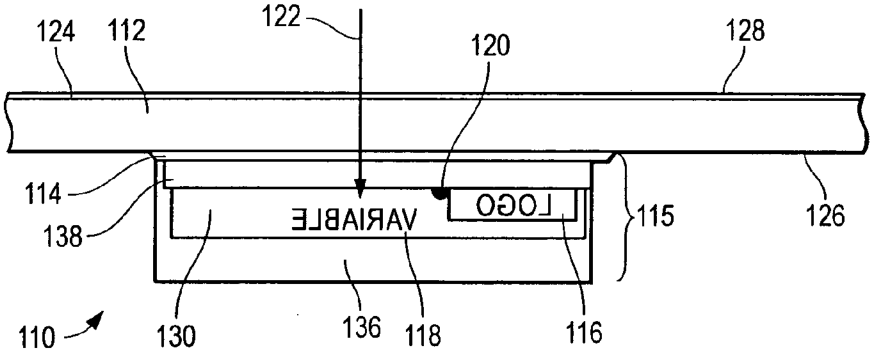
FIG. 2 is a cross-sectional illustration of another embodiment of a laser markable variable data heat transfer label configured for use with a light color object.

An alternate label 110 is illustrated in FIG. 2 which shows a label 110 that is configured for application to a light color background object or item. The label 110 includes the carrier web 112 on which the substrate 115 is provided. The web 112 is formed from a laser light-translucent or laser light-transmissive material to permit the use of a laser 122 that is directed through the rear or back side of the label 110 (i.e., through the carrier web 112) to carry out the marking function.

A release coat 114 is applied to the web 112 in discrete sections disposed on those areas at which the label 110 will be printed or in a continuous manner as discussed above. The use of a “spot” application of release coat 114 or continuous application of release coat (FIG. 1, release layer 14) depends upon the specific label 10, 110 requirements and the object onto which the label is applied. As with the previous label embodiment, the release coat 114 can be a silicone-type material. Typically, both sides of the carrier web 112 have a release coating 114, 124, and the release coatings will have different release characteristics. The printed side 126 will typically have a tighter release than the non-printed side 128, and the non-printed side 128 is typically a continuous release coating.

An optional clear top coat 138 can be applied over the release layer 114. A preferred top coat 138 is a cross-linked or high melt point polymer having a melting point of greater than about 300° F., preferably greater than about 325° F. and most preferably greater than about 350° F.

A fixed graphic component 116 is applied to the carrier web 112 (on the release layer 114 or, if used, on the top coat 138). The fixed graphic 116 can be a colored component of the label 110. Optionally, an eye mark 120 can be used and applied to the label 110 with the fixed graphic component 116. The eye mark 120 can be provided as a normal, ambient light visible material, or it can be provided as an ultraviolet or infrared visible (otherwise non-ambient visible) material. The eye mark 120 can be used to start or stop advancement of the web 112 or trigger a subsequent operation such as the actuation of a cutting device or to position the label 110 in a (web fed) heat transfer device. The eye mark 120 can also be used to verify the authenticity of the label 110 and to control the form, text, graphics, and the like of the variable data 118 marked on the label 110. The eye mark 120 can also be printed in the form of a two dimensional bar code such as those having a 2D Matrix Symbol that is commonly used in the industry, for example, as represented by DataMatrix, MaxiCode and QR Code. Other special conditions of lighting, for eye marks include electronic sensing, e.g., magnetic responsive inks. The machine readable eye marks may also be a component of the fixed graphics, through either graphic design parameters (such as shape, size, color contrast and the like), or the incorporation of special chemicals, including ultraviolet or infra-red active compounds, magnetic responsive inks, electrically activated luminescence, thermochromatic inks, photochromatic inks and the like.

A white or light color light alterable layer 130 is applied to the label 110, at least in part on the fixed graphic 116, and over the (optional) top coat 138 or the release layer 114. The light alterable layer 130 is formulated including a laser light alterable material. In a present label 110 for light object application, the laser light alterable material 130 includes a material that changes color when subjected to laser light energy. A current material based on molybdenum, titanium, zinc or the like is formulated with a cross-linked or high melt point polymer and applied to the label, over the fixed graphic component. Exemplary of these materials are oxyanion-containing compounds including molybdate, tungstate or analogous transition metal compounds, as disclosed in International Publication No. WO 0/074548. Such a material is that commercially available under the trademark DATALASE® from Sherwood Technology Ltd. of Cheshire, England.

In a present label 110, the light alterable layer 130 is formulated in a matrix containing a cross-linked or high melt point polymer, having a melt point of greater than about 300° F., preferably greater than about 325° F. and most preferably greater than about 350° F.

An adhesive layer 136 is applied over the light alterable layer 130. The adhesive layer 136 is that layer that adheres the label 110 to the object or item. In the present example (in which the object is light and the light alterable layer 130 is light), the adhesive layer 136 can be a light or transparent/translucent material. A present adhesive 136 is not a cross linked material, but has a lower melt point, less than about 275° F., preferably less than about 250° F. and most preferably less than about 230° F.

The variable graphic 118 is provided on the label 110 by exposing the material of the light alterable layer 130 to laser 122 light. By exposing selected areas to the laser 122 light energy, the color of the material 130 within the exposed area changes. As with the ablation marking above, the present color changing label 110 is exposed through the carrier web 112 by a CO2 laser. That is, the material 130 is exposed through the rear or back side of the label 110 (i.e., through the web 112) following formation of the label 110. In this manner, the variable graphic 118 can be provided on the label in a downstream process following manufacture of the labels 110, e.g., printing of the fixed graphic component.

Another variation of this technology that lies within the scope of this invention, involves the application of the label 10 or 110 to an article followed by laser marking of the variable data on the applied label. In this variation, the laser beam does not have to pass through the carrier web 12 or 112 to write the variable data on the label since the label, after application to the article, is fully exposed and not covered by the carrier web 12 or 112. In this variation, the carrier web does not need to be transparent to the laser beam and can be opaque, for example, a paper carrier web.

It is anticipated that the labels 10, 110 can be printed using a screen printing process; however, other processes can also be used including gravure, rotary screen, offset, or combinations of printing processes, for example, rotary screen and flexo, and the like. That is, those portions of the label 10, 110, including the application of the spot or continuous release coats 14, 114, the application of fixed graphic components 16, 116 and the application of the laser light alterable layers 30, 130 can all be carried out using these conventional processes. In addition, the subsequent layers, e.g., adhesive layers 36, 136 top coats 138 and the like, can likewise be applied using such conventional methods.

Such labels 10, 110 allow a manufacturer to purchase rolls of heat transfer labels with certain, desired fixed data preprinted and then mark the appropriate labels with variable data as need on-site. It will be understood that for purposes of the present disclosure, the terms graphics, data and indicia are used interchangeably to indicate the fixed printing of the label or the variable marking on the label.

Generally, the term "printing" connotes the application or transfer of colored or tinted areas, indicia and the like, through the use of inks, dyes, pigments or the like. In certain instances, portions of the labels can be formed or "printed" on the carrier web without a pigment or tint, thus providing a transparent label portion.

In an anticipated process, a master roll of multiple width printed labels is slit down to yield individual rolls 200 of material that are single width, i.e., rolls having one row of labels 10, 110. These rolls in the single width form can be supplied to, for example, the article manufacturer.

The variable data is formed or marked on the label 10, 110 prior to applying the label to the object. It is contemplated that the marking of variable data 18, 118 will done at a different time and in a step separate from the printing of the fixed graphics 16, 116. In fact, it is anticipated that the variable data 18, 118 will be marked at the article manufacturer's plant or at a nearby service facility using a laser inscribing variable data marking process. As set forth above, the variable data process is carried out using a CO2 laser 22, 122 or like commercial application laser.

Figure 3:
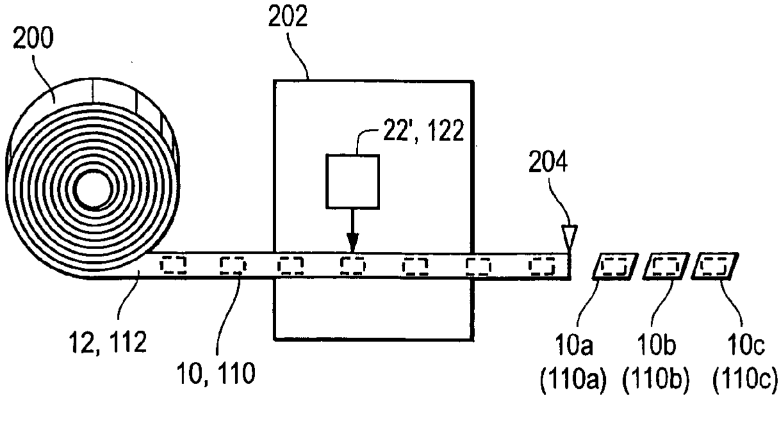
FIG. 3 is a illustrates an exemplary apparatus for marking the variable data onto the labels.

It is anticipated that a variable data marking unit 202 in a stand-alone configuration or as part of the application process will be used at the article manufacturer's facility. Referring to FIG. 3, in the stand-alone configuration, the variable data marking unit 202 marks the labels 10, 110 at a location remote to the application station. The labels 10, 110 can then be cut into individual labels 10*a,b,c* (110*a,b,c*), at for example a cutter 204, and delivered to an application machine station as discrete, single piece labels. Alternately, the labels can be delivered to the applicator in roll form. This process allows the article manufacturer to have a different number of variable data markers 202 (generally fewer) as compared to the number of application machines. This also allows the variable data marker 202 to be located in a central location within the facility to enhance security and provide better control of label inventory, both pre-printed and printed.

Alternately, the variable data marking unit 202 can be associated with the application machine. In this configuration, a roll of pre-printed labels is mounted on the marker-application machine, the labels are transported through the variable data marking unit where the label is marked with variable data, and then the labels are advanced into the application section of the machine for application to the article.

All patents referred to herein, are hereby incorporated herein by reference, whether or not specifically done so within the text of this disclosure.

In the disclosures, the words "a" or "an" are to be taken to include both the singular and the plural. Conversely, any reference to plural items shall, where appropriate, include the singular.

From the foregoing it will be observed that numerous modification and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A laser markable heat transfer label for application to an item, comprising:

a light transmissive carrier;

a heat transferable substrate disposed on the carrier, the substrate formulated, at least in part, with a laser light alterable material;

an adhesive disposed on the substrate; and a release layer disposed in discrete regions on the carrier web between the substrate and the carrier web, wherein a variable graphic component is marked on the label by application of a laser light through the light transmissive carrier, into the substrate to alter the laser light alterable material, the variable graphic component being marked prior to application of the heat transfer label to the item.

2. A laser markable heat transfer label for application to an item, comprising:

a light transmissive carrier;

a heat transferable substrate disposed on the carrier, the substrate formulated, at least in part, with a laser light alterable material, the laser light alterable material being a laser light ablatable material; and an adhesive disposed on the substrate, wherein a variable graphic component is marked on the label by application of a laser light through the light transmissive carrier, into the substrate to alter the laser light alterable material, the variable graphic component being marked prior to application of the heat transfer label to the item, and wherein the laser light abatable material is a dark color material and wherein a contrasting color layer is disposed on the laser light ablatable material between the laser light ablatable material and the adhesive.

3. The heat transfer label in accordance with claim 2 wherein the contrasting color layer is a light color.

4. A laser markable heat transfer label for application to an item, comprising:

a light transmissive carrier;

a heat transferable substrate disposed on the carrier, the substrate formulated, at least in part, with a laser light alterable material, the laser light alterable material being a laser light ablatable material; and an adhesive disposed on the substrate, wherein a variable graphic component is marked on the label by application of a laser light through the light transmissive carrier, into the substrate to alter the laser light alterable material, the variable graphic component being marked prior to application of the heat transfer label to the item, and including a fixed graphic component disposed on the label, adjacent the laser light ablatable material.

5. The heat transfer label in accordance with claim 4 including an eye mark disposed on the label, within the substrate.

6. The heat transfer label in accordance with claim 5 wherein the eye mark is adjacent the fixed graphic component.

7. The heat transfer label in accordance with claim 5 wherein the eye mark is part of the fixed graphic component.

8. A heat transfer label for application to an item, comprising:

a light transmissive carrier;

a heat transferable substrate disposed on the carrier, the substrate formulated, at least in part, with a laser light alterable material;

a release coat disposed on the web, between the substrate and the carrier web; and an adhesive disposed on the substrate, wherein a variable graphic component is marked on the label by application of a laser light through the light transmissive carrier, into the substrate to alter the laser light alterable material, the variable graphic component being marked prior to application of the heat transfer label to the item, wherein the laser light alterable material has a first color prior to being exposed to laser light and a second, different color after being exposed to laser light.

9. The heat transfer label in accordance with claim 8 wherein the release layer is a continuous layer on the carrier web.

10. The heat transfer label in accordance with claim 8 wherein the release layer is disposed in discrete regions on the carrier web.

11. The heat transfer label in accordance with claim 8 including a fixed graphic component disposed on the carrier web, adjacent, at least in part, the laser light alterable layer and within the substrate.

12. The heat transfer label in accordance with claim 11 including a eye mark disposed on the label within the substrate.

13. The heat transfer label in accordance with claim 12 wherein the eye mark is disposed adjacent the fixed graphic component.

14. The heat transfer label in accordance with claim 8 including a top coat disposed on the release layer.

15. The heat transfer label in accordance with claim 14 wherein the top coat is a cross-linked or high melt point polymer having a melting point of at least 300° F.

16. The heat transfer label in accordance with claim 14 wherein the top coat forms part of the substrate, and wherein the laser light alterable material is disposed on the top coat, opposite of the release layer.

17. A laser markable heat transfer label for application to an item, comprising:

a light transmissive carrier;

a heat transferable substrate disposed on the carrier, the substrate formulated, at least in part, with a laser light alterable material, the light alterable material being formulated in a matrix including a cross-linked or high melt point polymer; and an adhesive disposed on the substrate, wherein a variable graphic component is marked on the label by application of a laser light through the light transmissive carrier, into the substrate to alter the laser light alterable material, the variable graphic component being marked prior to application of the heat transfer label to the item, wherein the laser light alterable material has a first color prior to being exposed to laser light and a second, different color after being exposed to laser light.

18. The heat transfer label in accordance with claim 17 wherein the cross-linked or high melt point polymer has a melting point of at least 300° F.

19. A laser markable heat transfer label for application to an item, comprising:

a light transmissive carrier;

a heat transferable substrate disposed on the carrier, the substrate formulated, at least in part, with a laser light alterable material, the light alterable material is formulated in part from an oxyanion-containing compound; and an adhesive disposed on the substrate, wherein a variable graphic component is marked on the label by application of a laser light through the light transmissive carrier, into the substrate to alter the laser light alterable material, the variable graphic component being marked prior to application of the heat transfer label to the item, wherein the laser light alterable material has a first color prior to being exposed to laser light and a second, different color after being exposed to laser light.

20. The heat transfer label in accordance with claim 19 wherein the oxyanion-containing compound is formulated with a cross-linked or high melt point polymer.

21. A laser markable heat transfer label for application to an item, comprising:

a light transmissive carrier;

a heat transferable substrate disposed on the carrier, the substrate formulated, at least in part, with a laser light alterable material; and an adhesive disposed on the substrate, wherein a variable graphic component is marked on the label by application of a laser light through the light transmissive carrier, into the substrate to alter the laser light alterable material, the variable graphic component being marked prior to application of the heat transfer label to the item, wherein a plurality of heat transfer labels are disposed on the carrier web and wherein the variable graphic component varies from a first label to an adjacent label.

22. A method for marking an item comprising the steps of:

providing an elongated light transmissive carrier web;

applying a heat transferable substrate having a laser light alterable material disposed in a polymer matrix to the carrier web;

printing a series of fixed graphic components on the substrate and slitting the elongated strip in the elongated direction to form multiple strips of item applicable labels; and exposing the substrate having the laser light alterable material therein to a laser to alter a portion of the light alterable material to form a variable graphic component, the variable graphic component being formed subsequent to printing the fixed graphic component on the substrate, the variable graphic component being marked separate from the step of applying the heat transferable substrate to the carrier web to form an elongated strip of heat transferable labels.

23. The method in accordance with claim 22 including the step of slitting the multiple strips of item applicable labels to form item applicable labels.

24. A method for marking an item comprising the steps of:

providing an elongated light transmissive carrier web;

applying a heat transferable substrate having a laser light alterable material disposed in a polymer matrix to the carrier web;

exposing the substrate having the laser light alterable material therein to a laser to alter a portion of the light alterable material to form a variable graphic component, the variable graphic component being marked separate from the step of applying the heat transferable substrate to the carrier web to form an elongated strip of heat transferable labels;

transversely slitting the elongated strip of heat transferable labels to provide item applicable labels;

positioning the label on the item with the web away from the item and applying heat to the web to transfer the label to the item; and transferring the item applicable labels to the item.

25. A method for marking an item comprising the steps of:

providing an elongated light transmissive carrier web;

applying a heat transferable substrate having a laser light alterable material disposed in a polymer matrix to the carrier web;

printing a fixed graphic component on the substrate at a first printer at a first speed; and exposing the substrate having the laser light alterable material therein to a laser to alter a portion of the light alterable material to form a variable graphic component subsequent to printing the fixed graphic component, the variable graphic component being marked a marker at a second speed, the first and second speeds being different from one another, the variable graphic component being formed separate from the step of applying the heat transferable substrate to the carrier web to form an elongated strip of heat transferable labels.

26. A method for marking an item comprising the steps of:

providing an elongated light transmissive carrier web;

applying a heat transferable substrate having a laser light alterable material disposed in a polymer matrix to the carrier web, the laser light alterable material being a laser light ablatable material, the laser light abatable material being applied as a dark color material;

subsequently applying a contrasting color layer disposed on the laser light ablatable material between the laser light ablatable material and the adhesive; and exposing the substrate having the laser light alterable material therein to a laser to alter a portion of the light alterable material to form a variable graphic component, the variable graphic component being marked separate from the step of applying the heat transferable substrate to the carrier web to form an elongated strip of heat transferable labels.

27. A laser markable heat transfer label for application to an item, comprising:

a carrier web;

a heat transferable substrate disposed on the carrier web, the substrate formulated, at least in part, with a laser light alterable material;

an adhesive layer disposed on the heat transferable substrate; and an eye mark disposed on the label, within the substrate, wherein the heat transferable substrate is transferred to an article using a combination of heat and pressure, and the variable graphic component is marked on the applied label by application of a laser light beam to effect a color change in those areas touched by the laser light beam.

28. The heat transfer label in accordance with claim 27 wherein the eye mark is adjacent the fixed graphic component.

29. The heat transfer label in accordance with claim 27 wherein the eye mark is part of the fixed graphic component.

30. The heat transfer label in accordance with claim 27 including a release coat disposed on the carrier web, between the substrate and the carrier web.

31. A laser markable heat transfer label for application to an item, comprising:

a carrier web;

a heat transferable substrate disposed on the carrier web, the substrate formulated, at least in part, with a laser light alterable material;

a fixed graphic component disposed on the carrier web, adjacent, at least in part, the laser light alterable layer and within the substrate; and an adhesive layer disposed on the heat transferable substrate, wherein the heat transferable substrate is transferred to an article using a combination of heat and pressure, and the variable graphic component is marked on the applied label by application of a laser light beam to effect a color change in those areas touched by the laser light beam.

32. A laser markable heat transfer label for application to an item, comprising:

a carrier web;

a heat transferable substrate disposed on the carrier web, the substrate formulated, at least in part, with a laser light alterable material, the light alterable material being formulated in a matrix including a cross-linked or high melt point polymer; and an adhesive layer disposed on the heat transferable substrate, wherein the heat transferable substrate is transferred to an article using a combination of heat and pressure, and the variable graphic component is marked on the applied label by application of a laser light beam to effect a color change in those areas touched by the laser light beam.

33. The heat transfer label in accordance with claim 32 wherein the cross-linked or high melt point polymer has a melting point of at least 300° F.

34. A laser markable heat transfer label for application to an item, comprising:

a carrier web;

a heat transferable substrate disposed on the carrier web, the substrate formulated, at least in part, with a laser light alterable material, the light alterable material being is formulated in part from an oxyanion-containing compound; and an adhesive layer disposed on the heat transferable substrate, wherein the heat transferable substrate is transferred to an article using a combination of heat and pressure, and the variable graphic component is marked on the applied label by application of a laser light beam to effect a color change in those areas touched by the laser light beam.

35. The heat transfer label in accordance with claim 34 wherein the oxyanion-containing compound is formulated with a cross-linked or high melt point polymer.

36. The heat transfer label in accordance with claim 35 including a top coat disposed on the release layer.

37. The heat transfer label in accordance with claim 36 wherein the top coat is a cross-linked or high melt point polymer having a melting point of at least 300° F.

38. The heat transfer label in accordance with claim 37 wherein the top coat forms part of the substrate, and wherein the laser light alterable material is disposed on the top coat, opposite of the release layer.

39. A laser markable heat transfer label for application to an item, comprising:

a carrier web;

a heat transferable substrate disposed on the carrier web, the substrate formulated, at least in part, with a laser light alterable material; and an adhesive layer disposed on the heat transferable substrate, wherein the heat transferable substrate is transferred to an article using a combination of heat and pressure, and the variable graphic component is marked on the applied label by application of a laser light beam to effect a color change in those areas touched by the laser light beam, wherein a plurality of heat transfer labels are disposed on the carrier web, and wherein the variable graphic component varies from a first label to an adjacent label.

* * * * *